UNITED STATES PATENT OFFICE.

HUGO MICHAELIS, OF BERLIN, PRUSSIA, ASSIGNOR TO GEBR. STOLLWERCK, OF COLOGNE-ON-THE-RHINE, GERMANY.

MANUFACTURE OF EFFERVESCENT SUGAR.

SPECIFICATION forming part of Letters Patent No. 342,624, dated May 25, 1886.

Application filed February 4, 1886. Serial No. 190,835. (No specimens.) Patented in England June 15, 1883, No. 2,989, and in Germany July 6, 1883, No. 25,789.

*To all whom it may concern:*

Be it known that I, HUGO MICHAELIS, Ph. D., of the city of Berlin, in the Kingdom of Prussia and German Empire, have invented a certain new and useful Improvement in the Manufacture of Effervescent Sugar, (for which I have obtained patents in Germany, No. 25,789, July 6, 1883, and Great Britain, No. 2,989, June 15, 1883,) of which the following is a specification.

This invention relates to an improvement in the manufacture of effervescent sugar, and more particularly to that as described in former United States Letters Patent, No. 284,464, of September 4, 1883; and it consists in a modified arrangement of the sugar, the acid, and the bicarbonate of soda, so as to keep the latter two substances separate from each other by means of the third substance, (*i. e.*, the sugar,) in order to provide against premature reaction and cause the compound to keep without spoiling in case of moisture accidentally reaching the same.

The said compound consists, principally, of pulverized sugar, bicarbonate of soda, and citric or tartaric acid. The sugar, which is preferably flavored by adding to it some suitable volatile oil or perfume, so as to give it a flavor of raspberry, apple, ginger, pineapple, or other fruit, but which may be mixed with some medicine or drug in a pulverized state—such as chininum sulphuricum, ferrum oxidatum dialysatum, santoninum, or the like—is neither mixed with the bicarbonate of soda nor with the acid, but in its unmixed state is arranged with regard to the carbonate and acid so as to form a separating layer between the latter.

In carrying my invention into effect I preferably use a mold of square or any other convenient shape, wherein I place a suitable quantity of bicarbonate of soda, which is then pressed together by means of a pestle or stamper. I then place on top of the compressed basis of carbonate a suitable quantity of the pulverized sugar, and press this down upon the carbonate in a similar manner, whereupon I add a third layer of citric or tartaric acid, which is firmly pressed down upon the sugar, so that a coherent effervescent lump or lozenge will be formed, consisting of carbonate, sugar, and acid, the two substances producing effervescence when combined in the presence of a liquid being separated from each other by means of the intermediate layer of sugar, so that no reaction can take place in case of the lump becoming moist by accident. It is obvious that I may arrange as many layers in this wise as may be found convenient, by placing upon the layer of acid another layer of sugar, then another layer of carbonate, then another layer of sugar, and so on, and that in lieu of the carbonate I may use a layer of sugar or of acid as basis for the subsequent layers, so arranged that a layer of sugar will always form a protecting-wall between the said layers of acid and carbonate.

Having thus described my invention, what I claim as new, and desire to secure by Letters Patent, is—

1. A lump of effervescent sugar consisting of bicarbonate of soda, acid, and pulverized sugar, each of the said component parts being arranged in layers in such a manner that the layers of acid and carbonate will always be separated by an intermediate layer of sugar, substantially as and for the purpose specified.

2. A lump of effervescent sugar in which the ingredients producing effervesence when combined in the presence of moisture are arranged in layers separated from each other by an intermediate layer of sugar, substantially as described, and for the purpose specified.

In testimony whereof I have signed my name to this specification in the presence of two subscribing witnesses.

HUGO MICHAELIS.

Witnesses:
B. ROI,
M. W. MOORE.